(12) United States Patent
Lou et al.

(10) Patent No.: US 12,556,296 B2
(45) Date of Patent: Feb. 17, 2026

(54) SIGNAL PROCESSING DEVICES, SYSTEMS AND METHOD, AND SIGNAL TRANSMISSION SUBSYSTEM AND SYSTEM

(71) Applicant: CHINA TELECOM CORPORATION LIMITED, Beijing (CN)

(72) Inventors: Xiaowei Lou, Beijing (CN); Junjie Li, Beijing (CN); Xiaoli Huo, Beijing (CN); Qian Hu, Beijing (CN); Anxu Zhang, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/853,497

(22) PCT Filed: Oct. 18, 2022

(86) PCT No.: PCT/CN2022/125836
§ 371 (c)(1),
(2) Date: Oct. 2, 2024

(87) PCT Pub. No.: WO2023/197549
PCT Pub. Date: Oct. 19, 2023

(65) Prior Publication Data
US 2025/0219754 A1 Jul. 3, 2025

(30) Foreign Application Priority Data
Apr. 11, 2022 (CN) .......................... 202210376953.2

(51) Int. Cl.
*H04J 3/16* (2006.01)
*H04J 14/02* (2006.01)

(52) U.S. Cl.
CPC ........ *H04J 3/1652* (2013.01); *H04J 14/0305* (2023.08); *H04J 2203/005* (2013.01)

(58) Field of Classification Search
CPC ................. H04J 3/1652; H04J 14/0305; H04J 2203/005; H04J 14/02; H04J 14/0278;
(Continued)

(56) References Cited

U.S. PATENT DOCUMENTS 5,969,836 A * 10/1999 Foltzer .................. H04J 14/025
398/72
2010/0086308 A1 4/2010 Zhang et al.
(Continued)

FOREIGN PATENT DOCUMENTS

CN 101447850 A 6/2009
CN 204948081 U 1/2016
(Continued)

OTHER PUBLICATIONS

International Search Report for International Application No. PCT/CN2022/125836.
(Continued)

*Primary Examiner* — Hibret A Woldekidan
(74) *Attorney, Agent, or Firm* — Perilla Knox & Hildebrandt LLP; Kenneth A. Knox (57) ABSTRACT

A signal processing device includes a first photoelectric conversion module and a second photoelectric conversion module; the first photoelectric conversion module is configured to receive an optical signal to be sent that is sent by a time synchronization device, convert the optical signal to be sent into an electric signal to be sent, and transmit the electric signal to be sent to the second photoelectric conversion module, where the optical signal to be sent is generated by the time synchronization device according to an initial electrical signal, and the initial electrical signal includes a service signal and a time synchronization signal; and the second photoelectric conversion module is configured to convert the electrical signal to be sent into a first
(Continued)

optical signal of a preset frequency, and send the first optical signal to a first optical path coupling device, causing the first optical path coupling device to couple the first optical signal to an optical signal transmission line for transmission.

10 Claims, 5 Drawing Sheets

(58) Field of Classification Search
CPC ........ H04J 14/08; H04J 3/0655; H04J 3/0641; H04J 3/0667; H04J 3/0652; H04J 3/0658; H04J 3/0647; H04J 3/0644; H04J 3/0638; H04B 10/0795; H04B 10/2589; H04B 10/0775; H04B 10/40; H04B 10/25753; H04L 2027/0089; H04L 2027/0097
See application file for complete search history.

(56) References Cited

U.S. PATENT DOCUMENTS

| | | |
|---|---|---|
| 2014/0328593 A1 | 11/2014 | Lamb et al. |
| 2015/0139664 A1* | 5/2015 | Han .................. H04L 7/0075 398/154 |
| 2018/0062825 A1* | 3/2018 | Miao ................ H04B 10/25753 |
| 2021/0067244 A1 | 3/2021 | Dong et al. |

FOREIGN PATENT DOCUMENTS

| | | |
|---|---|---|
| CN | 108418632 A | 8/2018 |
| CN | 108418648 A | 8/2018 |
| CN | 109981175 A | 7/2019 |
| CN | 110492941 A | 11/2019 |
| CN | 110505021 A | 11/2019 |
| CN | 110995389 A | 4/2020 |
| CN | 114696938 A | 7/2022 |

OTHER PUBLICATIONS

First Office Action for CN Patent Application No. 2022103769532.
First Office Action for JP Patent Application No. 2024-559957 of Jul. 8, 2025.

\* cited by examiner

SIGNAL PROCESSING DEVICES, SYSTEMS AND METHOD, AND SIGNAL TRANSMISSION SUBSYSTEM AND SYSTEM

CROSS REFERENCE TO RELATED APPLICATIONS

The present application is a National Stage Application of International Application No. PCT/CN2022/125836 filed on Oct. 18, 2022, which is based on and claims priority of a Chinese patent application No. 202210376953.2, filed on Apr. 11, 2024, the content of both of which is incorporated here by reference in its entirety.

TECHNICAL FIELD

The present disclosure relates to the field of optical communication technology, and in particular, to a signal processing device, a signal processing system, a signal processing method, a signal transmission subsystem, and a signal transmission system.

BACKGROUND

In the field of mobile communications, a communication device/system has respective device/system time. To ensure accurate transmission of a signal, a time deviation between communication devices/systems for transmitting a signal needs to be controlled within a certain range. Therefore, time synchronization needs to be performed between the communication devices/systems.

In the related art, time synchronization between communication devices/systems may be performed through an optical transport network (OTN)/wavelength division multiplex (WDM) system.

BRIEF SUMMARY

According to a first aspect of the present disclosure, there is provided a signal processing device, including a first photoelectric conversion module and a second photoelectric conversion module: the first photoelectric conversion module is configured to receive an optical signal to be sent that is sent by a time synchronization device, convert the optical signal to be sent into an electric signal to be sent, and transmit the electric signal to be sent to a second photoelectric conversion module, where the optical signal to be sent is generated by the time synchronization device according to an initial electrical signal, and the initial electrical signal includes a service signal and a time synchronization signal: and, the second photoelectric conversion module is configured to convert the electrical signal to be sent into a first optical signal of a preset frequency; and send the first optical signal to a first optical path coupling device, causing the first optical path coupling device to couple the first optical signal to an optical signal transmission line for transmission.

According to a second aspect of the present disclosure, there is provided a signal processing device, including a second photoelectric conversion module and a first photoelectric conversion module: the second photoelectric conversion module is configured to receive a first optical signal of a preset frequency sent by a first optical path coupling device, convert the first optical signal into a first electrical signal to be processed, and send the first electrical signal to be processed to a first photoelectric conversion module, where the first optical signal is obtained by the first optical path coupling device from an optical signal transmission line: and the first photoelectric conversion module is configured to convert the first electric signal to be processed into a first optical signal to be processed, and send the first optical signal to be processed to a time synchronization device.

According to a third aspect of the present disclosure, there is a signal processing system, including: a time synchronization device, the signal processing device according to the first aspect, and a first optical path coupling device: where the time synchronization device is configured to generate the optical signal to be sent according to an initial electrical signal, and send the optical signal to be sent to the signal processing device: the signal processing device is configured to convert the optical signal to be sent into the first optical signal of the preset frequency; and send the first optical signal to the first optical path coupling device: and the first optical path coupling device is configured to couple the first optical signal to the optical signal transmission line for transmission.

According to a fourth aspect of the present disclosure, there is provided a signal processing system, including: a time synchronization device, the signal processing device according to the second aspect, and a first optical path coupling device: where the first optical path coupling device is configured to obtain the first optical signal from the optical signal transmission line, and send the first optical signal to the signal processing device: and the signal processing device is configured to convert the first optical signal into the first optical signal to be processed, and send the first optical signal to be processed to the time synchronization device: and the time synchronization device is configured to convert the first optical signal to be processed into a first target electrical signal.

According to a fifth aspect of the present disclosure, there is provided a signal transmission subsystem. The signal transmission subsystem includes a first signal processing system, a second signal processing system, and an optical signal transmission line: the first signal processing system is the signal processing system according to the third aspect, and the second signal processing system is the signal processing system according to the fourth aspect: and the first signal processing system and the second signal processing system are connected through the optical signal transmission line.

According to a sixth aspect of the present disclosure, there is provided a signal transmission system. The signal transmission system includes a first signal transmission subsystem, a second signal transmission subsystem, and a relay device: the first signal transmission subsystem and the second signal transmission subsystem are the signal transmission subsystems according to the fifth aspect: in the first signal transmission subsystem, the first photoelectric conversion module of the second signal processing system is connected to a first end of the relay device; and in the second signal transmission subsystem, the first photoelectric conversion module of the first signal processing system is connected to a second end of the relay device.

According to a seventh aspect of the present disclosure, there is provided a signal processing method, including: receiving an optical signal to be sent that is sent by a time synchronization device, where the optical signal to be sent is generated by the time synchronization device according to an initial electrical signal, and the initial electrical signal includes a service signal and a time synchronization signal: converting the optical signal to be sent into an electrical signal to be sent; converting the electrical signal to be sent into a first optical signal of a preset frequency; and sending the first optical signal to a first optical path coupling device, causing the first optical path coupling device to couple the first optical signal to an optical signal transmission line for transmission.

According to an eighth aspect of the present disclosure, there is provided a signal processing method, including: receiving a first optical signal of a preset frequency sent by a first optical path coupling device, where the first optical signal is obtained by the first optical path coupling device from an optical signal transmission line; converting the first optical signal into a first electrical signal to be processed; converting the first electrical signal to be processed into a first optical signal to be processed; and sending the first optical signal to be processed to a time synchronization device.

It should be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. Understandably, the accompanying drawings in the following description are merely some embodiments of the present disclosure, and for those of ordinary skill in the art, other drawings may be obtained from these accompanying drawings without creative efforts.

DETAILED DESCRIPTION

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The described features, structures, or characteristics may be combined in any suitable manner in one or more embodiments. In the following description, numerous specific details are provided to give a thorough understanding of the embodiments of the present disclosure. Those skilled in the art will appreciate, however, that the technical solutions of the present disclosure may be practiced without one or more of the specific details, or other methods, components, devices, steps, etc. may be employed. In other instances, common general known technical solutions are not shown or described in detail to avoid obscuring aspects of the present disclosure due to a reversal of the order of host and guest.

In addition, the accompanying drawings are merely schematic illustrations of the present disclosure and are not necessarily drawn to scale. The same reference numerals in the drawings denote the same or similar parts, and thus their repeated description will be omitted. Some block diagrams shown in the accompanying drawings are functional entities and do not necessarily correspond to physically or logically independent entities. These functional entities may be implemented in the form of software, or implemented in one or more hardware modules. The modules can include integrated circuits or other circuitry, or can be implemented in different networks and/or processor devices and/or microcontroller devices or other circuitry. The flowcharts shown in the accompanying drawings are merely exemplary descriptions, and do not necessarily include all the steps. For example, some steps may also be decomposed, and some steps may be combined or partially combined. Therefore, the actual execution order of the steps may be changed according to actual situations.

In the related art, there is a solution that time synchronization is performed by transmitting a time synchronization signal between communication devices/systems through an OTN/WDM system. In this time synchronization solution, the time synchronization signal is usually encapsulated in service data. In the process of time synchronization between the communication devices/systems, an optical monitoring device is usually needed to extract the time synchronization signal from the service data, then the time synchronization signal is processed into an optical signal, and the optical signal is coupled to an optical signal transmission line through a multiplexer, for transmission.

The process of extracting the time synchronization signal by the optical monitoring device needs to consume a certain period of time, which may cause a deviation between the actual time of the time synchronization signal and the time of the extracted time synchronization signal, thus affecting the accuracy of the transmitted time synchronization signal. That is, the implementation process of the time synchronization solution between the communication devices provided in the related art is complex, the cost is high, and the accuracy of the synchronization result is poor.

In view of the above problems, according to example embodiments of the present disclosure, there is provided a signal processing device to improve the accuracy of the transmitted time synchronization signal. The signal processing device may be applied to a time synchronization signal transmission scenario based on a wavelength division multiplex system, and the signal processing device may include a first photoelectric conversion module and a second photoelectric conversion module; where, the first photoelectric conversion module is configured to receive an optical signal to be sent that is sent by the time synchronization device, convert the optical signal to be sent into an electric signal to be sent, and transmit the electrical signal to be sent to the second photoelectric conversion module; and the second photoelectric conversion module is configured to convert the electrical signal to be sent into a first optical signal of a preset frequency, and send the first optical signal to the first optical path coupling device, causing the first optical path coupling device to couple the first optical signal to the optical signal transmission line for transmission; where, the optical signal to be sent is generated by the time synchronization device according to an initial electrical signal, and the initial electrical signal includes a service signal and a time synchronization signal. In the process of transmitting the time synchronization signal, it does not need to extract the time synchronization signal from the service signal, thus improving the accuracy of the transmitted time synchronization signal.

Figure 1:
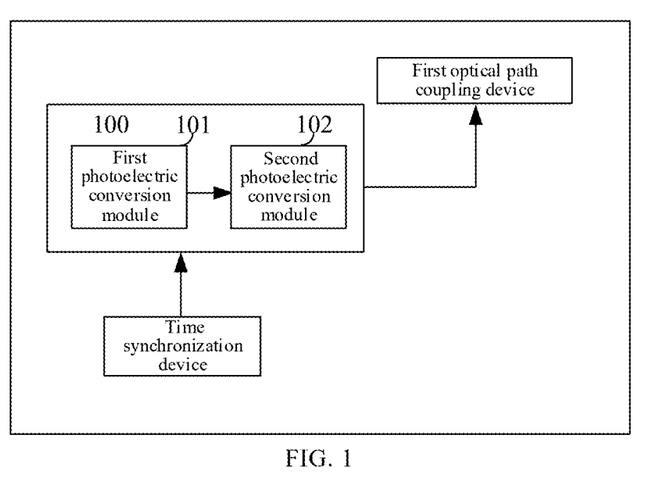
FIG. 1 is a schematic structural diagram of a signal processing device according to some embodiments of the present disclosure.

According to an embodiment of the present disclosure, there is provided a signal processing device, which may be applied to a time synchronization signal sending node. As shown in FIG. 1, the signal processing device 100 includes a first photoelectric conversion module 101 and a second photoelectric conversion module 102.

The first photoelectric conversion module 101 is configured to receive the optical signal to be sent that is sent by the time synchronization device, convert the optical signal to be sent into an electrical signal to be sent, and transmit the electrical signal to be sent to the second photoelectric conversion module, where the optical signal to be sent is generated by the time synchronization device according to an initial electrical signal, and the initial electrical signal includes a service signal and a time synchronization signal. For example, the first photoelectric conversion module 101 is a first photoelectric converter.

The second photoelectric conversion module 102 is configured to convert the electrical signal to be sent into a first optical signal of a preset frequency, and send the first optical signal to the first optical path coupling device, so that the first optical path coupling device couples the first optical signal to the optical signal transmission line for transmission. For example, the second photoelectric conversion module 102 is a second photoelectric converter.

In summary, in the signal processing device provided according to the embodiments of the present disclosure, the first photoelectric conversion module may receive the optical signal to be sent that is sent by the time synchronization device, convert the optical signal to be sent into an electrical signal to be sent, and transmit the electrical signal to be sent to the second photoelectric conversion module; and the second photoelectric conversion module may convert the electrical signal to be sent into a first optical signal of a preset frequency, and send the first optical signal to the first optical path coupling device, so that the first optical path coupling device couples the first optical signal to the optical signal transmission line for transmission. At the time synchronization signal sending node, the optical signal to be sent including the time synchronization signal may be directly converted into an optical signal of the preset frequency for transmission, without extracting the time synchronization signal from the optical signal to be sent, thus preventing interference caused by the process such as time synchronization signal extraction and processing on the accuracy of the time synchronization signal, and improving the accuracy of the transmitted time synchronization signal.

In some embodiments, the signal processing device may include an optical monitoring board card, and the optical monitoring board card may include a first photoelectric conversion module and a second photoelectric conversion module, where the first photoelectric conversion module and the second photoelectric conversion module may be small form-factor pluggable (SFP) modules.

It should be noted that, in the embodiments of the present disclosure, the time synchronization signal sending node needs to receive the time synchronization signal sent by the time synchronization signal receiving node, so that the time synchronization signal sending node performs correction on the time of the time synchronization signal sending node according to the time synchronization signal of the time synchronization signal receiving node, thus the time of the time synchronization signal receiving node and the time of the time synchronization signal sending node remain consistent with each other. In some embodiments, in order to prevent the optical signal sent by the time synchronization signal sending node and the optical signal sent by the time synchronization signal receiving node from interfering with each other in the optical signal transmission line, the optical signal sent by the time synchronization signal sending node and the optical signal sent by the time synchronization signal receiving node have different wavelengths, which may improve the transmission stability and reliability of the optical signal sent by the time synchronization signal sending node and the optical signal sent by the time synchronization signal receiving node.

In some embodiments, at the time synchronization signal sending node, the first photoelectric conversion module of the signal processing device is further configured to receive a second optical signal of a preset frequency sent by the second optical path coupling device, convert the second optical signal into a second electrical signal to be processed, and send the second electrical signal to be processed to the first photoelectric conversion module; and the first photoelectric conversion module is configured to convert the second electrical signal to be processed into a second optical signal to be processed, and send the second optical signal to be processed to the time synchronization device. In some embodiments, the second optical signal is obtained by the second optical path coupling device from the optical signal transmission line, and the second optical signal of the preset frequency may be transmitted by the time synchronization signal receiving node through the optical signal transmission line. The second optical signal obtained from the optical signal transmission line may be directly converted into an electrical signal and an optical signal at the time synchronization signal sending node, and in this process, the time synchronization signal does not need to be extracted and processed, so that the accuracy and efficiency of the obtained time synchronization signal may be improved. Moreover, the second optical signal in the optical signal transmission line and the first optical signal in the optical signal transmission line have different wavelengths, and they may not interfere with each other, so that the transmission stability and reliability of the first optical signal and the second optical signal may be improved.

In some embodiments, in the optical signal transmission line, transmission times of optical signals with different wavelengths are different. In order to reduce the delays of the optical signal sent by the time synchronization signal sending node and the optical signal sent by the time synchronization signal receiving node in the optical signal transmission line, and improve the transmission delay consistency between the optical signal sent by the time synchronization signal sending node and the optical signal sent by the time synchronization signal receiving node, the first optical signal and the second optical signal are optical signals with different wavelengths, and a wavelength difference between the first optical signal and the second optical signal is less than or equal to a preset wavelength threshold, where the preset wavelength threshold may be determined based on actual needs, which is not limited in the embodiments of the present disclosure. The delays of the optical signal sent by the time synchronization signal sending node and the optical signal sent by the time synchronization signal receiving node in the optical signal transmission line may be reduced, which may further improve the accuracy of the time synchronization signals obtained by the time synchronization signal sending node and the time synchronization signal receiving node.

For example, the wavelength of the first optical signal may be 196.0 THz, the wavelength of the second optical signal may be 196.1 THz. Since the wavelength difference between the first optical signal of 196.0 THz and the second optical signal of 196.1 THz is 0.1 THz, the transmission delays of the first optical signal and the second optical signal in the optical signal transmission line may be further reduced, and the accuracy of the time synchronization signals obtained by the time synchronization signal sending node and the time synchronization signal receiving node from the opposite ends is further improved. It can be understood that the opposite end of the time synchronization signal sending node is the time synchronization signal receiving node, and the opposite end of the time synchronization signal receiving node is the time synchronization signal sending node.

Figure 2:
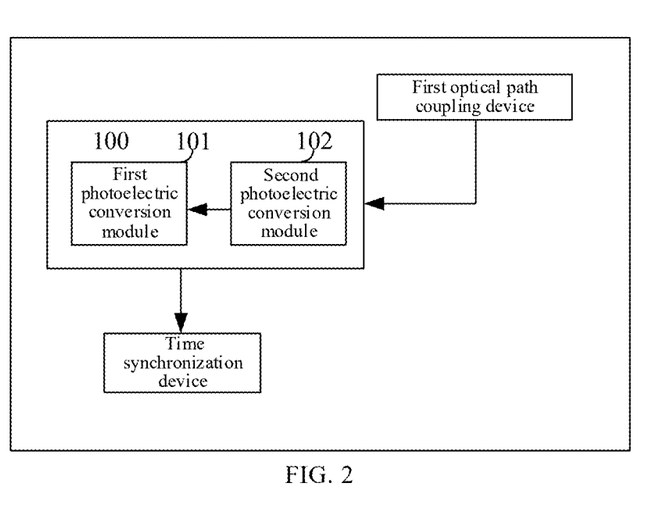
FIG. 2 is a schematic structural diagram of another signal processing device according to some embodiments of the present disclosure.

According to an embodiment of the present disclosure, there is provided a signal processing device, which may be applied to a time synchronization signal receiving nod. As shown in FIG. 2, the signal processing device 100 includes a second photoelectric conversion module 102 and a first photoelectric conversion module 101.

The second photoelectric conversion module 102 is configured to receive a first optical signal of a preset frequency sent by the first optical path coupling device, convert the first optical signal into a first electric signal to be processed, and send the first electric signal to be processed to the first photoelectric conversion module, where the first optical signal is obtained by the first optical path coupling device from the optical signal transmission line, and the first optical signal of the preset frequency may be transmitted by the time synchronization signal sending node through the optical signal transmission line. For example, the second photoelectric conversion module 102 is a second photoelectric converter.

The first photoelectric conversion module 101 is configured to convert the first electrical signal to be processed into a first optical signal to be processed, and send the first optical signal to be processed to the time synchronization device. For example, the first photoelectric conversion module 101 is a first photoelectric converter.

In summary, in the signal processing device provided according to the embodiment of the present disclosure, the second photoelectric conversion module may receive the first optical signal of the preset frequency sent by the first optical path coupling device, convert the first optical signal into a first electrical signal to be processed, and send the first electrical signal to be processed to the first photoelectric conversion module; and, the first photoelectric conversion module may convert the first electric signal to be processed into a first optical signal to be processed, and send the first optical signal to be processed to the time synchronization device. At the time synchronization signal receiving node, the first optical signal obtained from the optical signal transmission line may be directly converted into an electrical signal and an optical signal, without performing extraction processing on the time synchronization signal in the process, thus improving the accuracy and efficiency of the obtained time synchronization signal.

It should be noted that, in the embodiments of the present disclosure, the time synchronization signal receiving node needs to perform correction on the time of the time synchronization signal receiving node according to the time synchronization signal of the time synchronization signal sending node, so that the time of the time synchronization signal receiving node and the time of the time synchronization signal sending node remain consistent with each other. In some embodiments, in order to prevent the optical signal sent by the time synchronization signal sending node and the optical signal sent by the time synchronization signal receiving node from interfering with each other in the optical signal transmission line, the optical signal sent by the time synchronization signal sending node and the optical signal sent by the time synchronization signal receiving node have different wavelengths, which may improve the transmission stability and reliability of the optical signal sent by the time synchronization signal sending node and the optical signal sent by the time synchronization signal receiving node.

In some embodiments, at the time synchronization signal receiving node, the first photoelectric conversion module of the signal processing device is further configured to receive the optical signal to be sent that is sent by the time synchronization device, convert the optical signal to be sent into an electrical signal to be sent, and transmit the electrical signal to be sent to the second photoelectric conversion module; and, the second photoelectric conversion module is further configured to convert the electrical signal to be sent into a second optical signal of a preset frequency; and send the second optical signal to the second optical path coupling device, so that the second optical path coupling device couples the second optical signal to the optical signal transmission line for transmission. The optical signal to be sent including the time synchronization signal may be directly converted into a second optical signal with the preset frequency for transmission at the time synchronization signal receiving node, without extracting the time synchronization signal from the optical signal to be sent, so that the accuracy of the transmitted time synchronization signal may be improved. Moreover, at the time synchronization signal receiving node, the second optical signal coupled to the optical signal transmission line and the first optical signal in the optical signal transmission line have different wavelengths, and they may not interfere with each other, so that the transmission stability and reliability of the first optical signal and the second optical signal may be improved.

In some embodiments, in the optical signal transmission line, transmission times of optical signals with different wavelengths are different. In order to reduce the delays of the optical signal sent by the time synchronization signal sending node and the optical signal sent by the time synchronization signal receiving node in the optical signal transmission line, and improve the transmission delay consistency between the optical signal sent by the time synchronization signal sending node and the optical signal sent by the time synchronization signal receiving node, the first optical signal and the second optical signal are optical signals with different wavelengths, and a wavelength difference between the first optical signal and the second optical signal is less than or equal to a preset wavelength threshold, where the preset wavelength threshold may be determined based on actual needs, which is not limited in the embodiments of the present disclosure. The delays of the optical signal sent by the time synchronization signal sending node and the optical signal sent by the time synchronization signal receiving node in the optical signal transmission line may be reduced, which may further improve the accuracy of the time synchronization signals obtained by time synchronization signal sending node and the time synchronization signal receiving node.

For example, the wavelength of the first optical signal may be 196.0 THz, the wavelength of the second optical signal may be 196.1 THz. Since the wavelength difference between the first optical signal of 196.0 THz and the second optical signal of 196.1 THz is 0.1 THz, the transmission delay of the first optical signal and the second optical signal in the optical signal transmission line may be further reduced, and the accuracy of the time synchronization signals obtained by the time synchronization signal sending node and the time synchronization signal receiving node from the opposite ends is further improved. It can be understood that the opposite end of the time synchronization signal sending node is the time synchronization signal receiving node, and the opposite end of the time synchronization signal receiving node is the time synchronization signal sending node.

Figure 3:
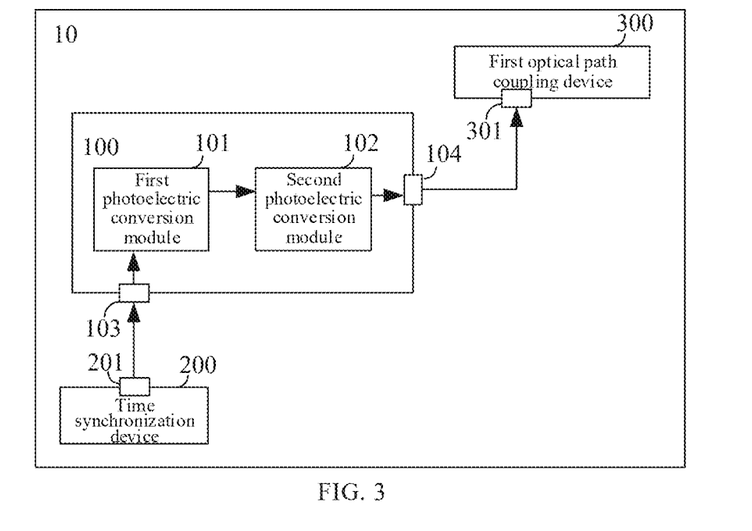
FIG. 3 is a schematic structural diagram of a signal processing system according to some embodiments of the present disclosure.

According to an embodiment of the present disclosure, there is provided a signal processing system 10, which may be applied to a time synchronization signal sending node. As shown in FIG. 3, the signal processing system 10 includes a time synchronization device 200, a signal processing device 100 in the foregoing embodiments, and a first optical path coupling device 300.

The time synchronization device 200 is configured to generate an optical signal to be sent according to an initial electrical signal, and send the optical signal to be sent to the signal processing device 100, where the initial electrical signal includes a service signal and a time synchronization signal.

The signal processing device 100 is configured to convert the optical signal to be sent into a first optical signal of a preset frequency, and send the first optical signal to the first optical path coupling device 300.

In the embodiments, for the process of converting the optical signal to be sent into the first optical signal of the preset frequency by the signal processing device, reference may be made to the foregoing embodiments, and details are not described here again in the present disclosure. The first optical path coupling device 300 is configured to couple the first optical signal to the optical signal transmission line for transmission.

In summary, in the signal processing system provided according to the embodiments of the present disclosure, the time synchronization device may generate an optical signal to be sent according to an initial electrical signal, and send the optical signal to be sent to the signal processing device: the signal processing device may convert the optical signal to be sent into a first optical signal of a preset frequency; and send the first optical signal to the first optical path coupling device; and the first optical path coupling device is configured to couple the first optical signal to the optical signal transmission line for transmission. At the time synchronization signal sending node, the signal processing system may be used to directly convert the optical signal to be sent including the time synchronization signal into the first optical signal for transmission, without extracting the time synchronization signal from the optical signal to be sent, thus improving the accuracy of the transmitted time synchronization signal.

In some embodiments, the time synchronization device may include a synchronization gigabit ethernet (GE) interface and a time synchronization signal interface. The synchronization GE interface is configured to obtain a service signal. The time synchronization signal interface may obtain a time synchronization signal sent by a clock device, encapsulate the service signal and the time synchronization signal into an initial electrical signal, and convert the initial electrical signal into an optical signal to be sent, where the wavelength of the optical signal to be sent may be determined based on actual needs, which is not limited in the embodiments of the present disclosure. For example, the wavelength of the optical signal to be sent may be 1310 nm.

It should be noted that, in the embodiments of the present disclosure, the devices in the signal processing system are connected through interfaces on the devices and optical signal transmission lines between the interfaces. For example, as shown in FIG. 3, the time synchronization device 200 is connected to the second interface 103 on the signal processing device 100 through the first interface 201 in the time synchronization device 200, and the signal processing device 100 is connected to the fourth interface 301 in the first optical path coupling device 300 through the third interface 104 in the signal processing device 100.

In some embodiments, the time synchronization device 200 sends the optical signal to be sent to the second interface 103 of the signal processing device 100 through the first interface 201. The signal processing device 100 obtains the optical signal to be sent through the second interface 103, converts the optical signal to be sent into the first optical signal of the preset frequency, and sends the first optical signal to the fourth interface 301 of the first optical path coupling device through the third interface 104. The first optical path coupling device 302 may obtain the first optical signal through the fourth interface 301 and couple the first optical signal to the optical signal transmission line for transmission.

Figure 4:
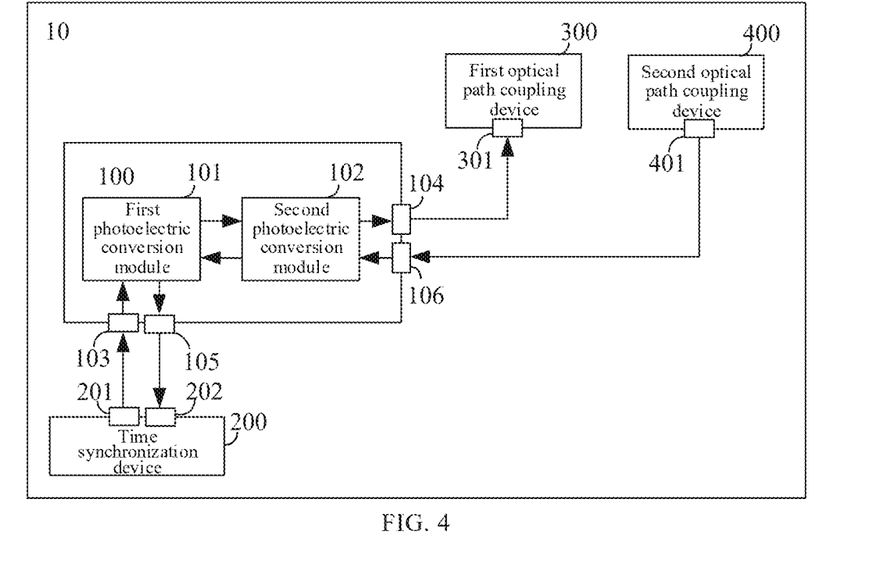
FIG. 4 is a schematic structural diagram of another signal processing system according to some embodiments of the present disclosure.

In some embodiments, the time synchronization signal sending node further needs to receive a time synchronization signal sent by the time synchronization signal receiving node, so as to facilitate time synchronization. As shown in FIG. 4, the signal processing system 10 further includes a second optical path coupling device 400.

The second optical path coupling device 400 is configured to obtain a second optical signal from the optical signal transmission line, and send the second optical signal to the signal processing device 100, where the second optical signal is sent by the time synchronization signal receiving node, the second optical signal is determined by the time synchronization signal sending node based on the initial electrical signal, and the initial electrical signal includes a service signal and a time synchronization signal.

The signal processing device 100 is configured to convert the second optical signal into a second optical signal to be processed, and send the second optical signal to be processed to the time synchronization device 200.

In the embodiments, for the process of converting the second optical signal into the second optical signal to be processed by the signal processing device, reference may be made to the foregoing embodiments, and details are not described here again in the present disclosure.

The time synchronization device 200 is configured to convert the second optical signal to be processed into a second target electrical signal.

In some embodiments, the second target electrical signal carries the time synchronization signal of the time synchronization signal receiving node, so that the time synchronization signal sending node may perform correction on the time of the time synchronization signal sending node according to the time synchronization signal sent by the time synchronization signal receiving node, ensuring that the time of the time synchronization signal sending node is consistent with the time of the time synchronization signal receiving node. Moreover, at the time synchronization signal sending node, the signal processing system may be used to directly obtain the second optical signal including the time synchronization signal from the optical signal transmission line and convert the second optical signal into the second target optical signal, without extracting the time synchronization signal from the second optical signal, thus improving the accuracy of the obtained time synchronization signal.

It should be noted that, in the embodiments of the present disclosure, the devices in the signal processing system are connected through interfaces on the devices and optical signal transmission lines between the interfaces. As shown in FIG. 4, the time synchronization device 200 is connected to the sixth interface 105 on the signal processing device 100 through the fifth interface 202 in the time synchronization device 200, and the signal processing device 100 is connected to the eighth interface 401 in the second optical path coupling device 400 through the seventh interface 106 in the signal processing device 100.

Figure 5:
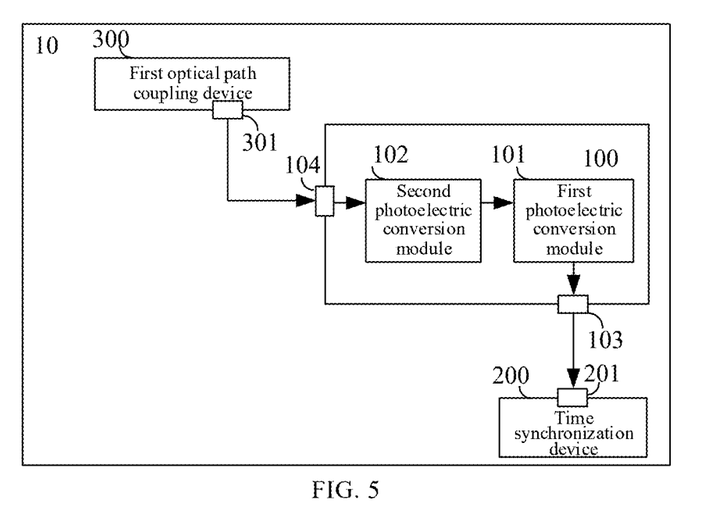
FIG. 5 is a schematic structural diagram of yet another signal processing system according to some embodiments of the present disclosure.

In some embodiments, the second optical path coupling device 400 sends the second optical signal to the seventh interface 106 of the signal processing device 100 through the eighth interface 401. The signal processing device 100 obtains the second optical signal through the seventh interface 106, converts the second optical signal into the second optical signal to be processed, and sends the second optical signal to be processed to the fifth interface 202 of the time synchronization device 200 through the sixth interface 105. The time synchronization device 200 may obtain the second optical signal to be processed through the fifth interface 202, and convert the second optical signal to be processed into the second target electrical signal. According to an embodiment of the present disclosure, there is provided a signal processing system 10, which may be applied to a time synchronization signal receiving node. As shown in FIG. 5, the signal processing system 10 includes a time synchronization device 200, a signal processing device 100 in the foregoing embodiment, and a first optical path coupling device 300.

The first optical path coupling device 300 is configured to obtain a first optical signal from an optical signal transmission line, and send the first optical signal to the signal processing device 100.

In some embodiments, the first optical signal is an optical signal sent by the time synchronization signal sending node, the first optical signal is determined by the time synchronization signal sending node according to an initial electrical signal, and the initial electrical signal includes a service signal and a time synchronization signal.

The signal processing device 100 is configured to convert the first optical signal into a first optical signal to be processed, and send the first optical signal to be processed to the time synchronization device 200.

In the embodiments, for the process of converting the first optical signal into the first optical signal to be processed by the signal processing device, reference may be made to the foregoing embodiments, and details are not described here again in the present disclosure.

The time synchronization device 200 is configured to convert the first optical signal to be processed into a first target electrical signal.

In some embodiments, the first target electrical signal carries the time synchronization signal of the time synchronization signal sending node, so that the time synchronization signal receiving node may perform correction on the time of the time synchronization signal receiving node according to the time synchronization signal sent by the time synchronization signal sending node, ensuring that the time of the time synchronization signal sending node is consistent with the time of the time synchronization signal receiving node.

In summary, in the signal processing system provided according to the embodiments of the present disclosure, the first optical path coupling device may obtain the first optical signal from the optical signal transmission line, and send the first optical signal to the signal processing device. The signal processing device may convert the first optical signal into the first optical signal to be processed, and send the first optical signal to be processed to the time synchronization device. The time synchronization device may convert the first optical signal to be processed into the first target electrical signal. At the time synchronization signal receiving node, the signal processing system may be used to directly obtain the first optical signal including the time synchronization signal from the optical signal transmission line and convert the first optical signal into the first target optical signal, without extracting the time synchronization signal from the first optical signal, thus improving the accuracy of the obtained time synchronization signal.

It should be noted that, in the embodiments of the present disclosure, the devices in the signal processing system are connected through interfaces on the devices and optical signal transmission lines between the interfaces. As shown in FIG. 5, the time synchronization device 200 is connected to the second interface 103 on the signal processing device 100 through the first interface 201 in the time synchronization device 200, and the signal processing device 100 is connected to the fourth interface 301 in the first optical path coupling device 300 through the third interface 104 in the signal processing device 100.

In some embodiments, after obtaining the first optical signal from the optical signal transmission line, the first optical path coupling device 300 sends the first optical signal to the third interface 104 of the signal processing device 100 through the fourth interface 301. The signal processing device 100 obtains the first optical signal through the third interface 104, converts the first optical signal into a first optical signal to be processed, and sends the first optical signal to be processed to the first interface 201 of the time synchronization device 200 through the second interface 103. The time synchronization device 200 obtains the first optical signal to be processed through the first interface 201, and converts the first optical signal to be processed into the first target electrical signal.

Figure 6:
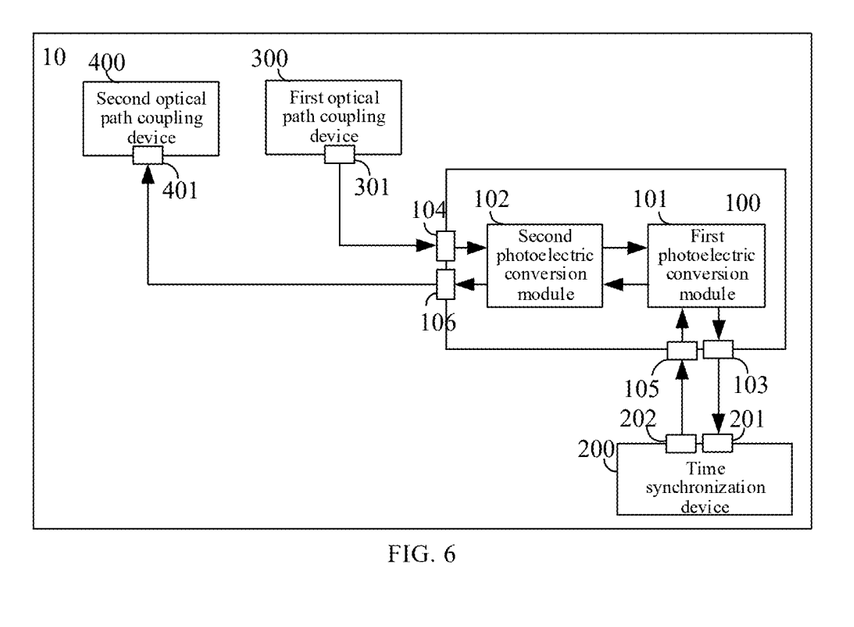
FIG. 6 is a schematic structural diagram of still another signal processing system according to some embodiments of the present disclosure.

In some embodiments, the time synchronization signal receiving node further needs to send a time synchronization signal to the time synchronization signal sending node to facilitate time synchronization. As shown in FIG. 6, the signal processing system 10 further includes a second optical path coupling device 400.

The time synchronization device 200 is configured to generate an optical signal to be sent according to an initial electrical signal, and send the optical signal to be sent to the signal processing device 100, where the initial electrical signal includes a service signal and a time synchronization signal.

The signal processing device 100 is configured to convert the optical signal to be sent into a second optical signal of a preset frequency, and send the second optical signal to the second optical path coupling device 400.

In the embodiments, for the process of converting the optical signal to be sent into the second optical signal of the preset frequency by the signal processing device, reference may be made to the foregoing embodiments, and details are not described here again in the present disclosure. The second optical path coupling device 400 is configured to couple the second optical signal to the optical signal transmission line for transmission. At the time synchronization signal receiving node, the signal processing system may be used to directly convert the optical signal to be sent including the time synchronization signal into the second optical signal for transmission, without extracting the time synchronization signal from the optical signal to be sent, thus improving the accuracy of the transmitted time synchronization signal.

It should be noted that, in the embodiments of the present disclosure, the devices in the signal processing system are connected through interfaces on the devices and optical signal transmission lines between the interfaces. As shown in FIG. 6, the time synchronization device 200 is connected to the sixth interface 105 on the signal processing device 100 through the fifth interface 202 in the time synchronization device 200, and the signal processing device 100 is connected to the eighth interface 401 in the second optical path coupling device 400 through the seventh interface 106 in the signal processing device 100.

In some embodiments, after generating the optical signal to be sent according to the initial electrical signal, the time synchronization device 200 sends the optical signal to be sent to the sixth interface 105 of the signal processing device 100 through the fifth interface 202. The signal processing device 100 obtains the optical signal to be sent through the sixth interface 105, converts the optical signal to be sent into a second optical signal of a preset frequency, and sends the second optical signal to the eighth interface 401 of the second optical path coupling device 400 through the seventh interface 106. The second optical path coupling device 400 obtains the second optical signal through the eighth interface 401, and couples the second optical signal to the optical signal transmission line for transmission.

According to an embodiment of the present disclosure, there is provided a signal transmission subsystem, including a first signal processing system, a second signal processing system, and an optical signal transmission line. The first signal processing system is a signal processing system applied to a time synchronization signal sending node in the foregoing embodiments, or the second signal processing system is a signal processing system applied to a time synchronization signal receiving node in the foregoing embodiments, where the first signal processing system and the second signal processing system are connected through the optical signal transmission line. The first signal processing system is applied to a time synchronization signal sending node, and the second signal processing system is applied to a time synchronization signal receiving node. The optical signal transmission line may be an optical fiber, an optical cable, or the like.

Figure 7:
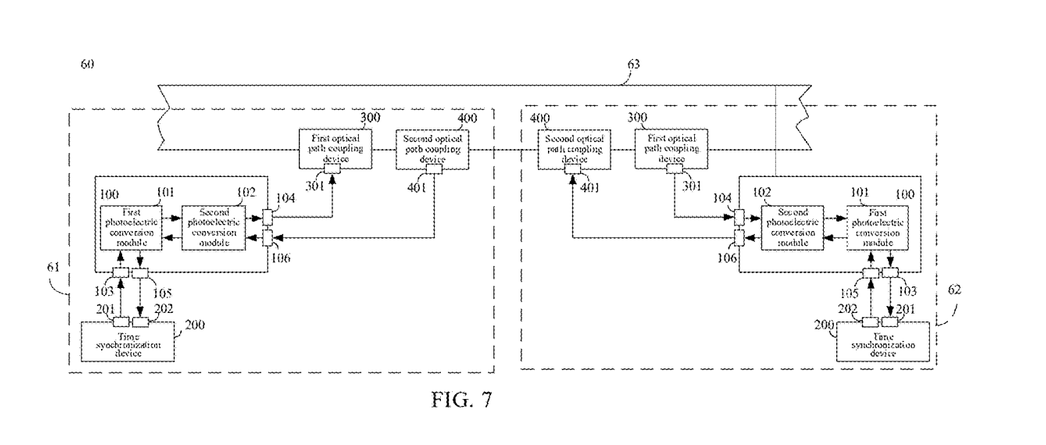
FIG. 7 is a schematic structural diagram of a signal transmission subsystem according to some embodiments of the present disclosure.

In some embodiments, FIG. 7 shows a schematic structural diagram of a signal transmission subsystem. As shown in FIG. 7, the signal transmission subsystem 60 includes a first signal processing system 61, a second signal processing system 62, and an optical signal transmission line 63. The first signal processing system is a signal processing system applied to a time synchronization signal sending node in the foregoing embodiments, and the second signal processing system is a signal processing system applied to a time synchronization signal receiving node in the foregoing embodiments, where the first signal processing system 61 and the second signal processing system 62 are connected through the optical signal transmission line 63. The first signal processing system is applied to a time synchronization signal sending node, and the second signal processing system 62 is applied to a time synchronization signal receiving node. The optical signal transmission line may be an optical fiber, an optical cable, or the like.

In some embodiments, the first signal processing system 61 is configured to determine a first optical signal according to an initial electrical signal, and couple the first optical signal to the optical signal transmission line 63, so that the optical signal transmission line 63 transmits the first optical signal to the second signal processing system 62.

The second signal processing system 62 is configured to obtain the first optical signal from the optical signal transmission line 63, and determine a first target electrical signal according to the first optical signal, so as to synchronize the time of the time synchronization signal receiving node and the time of time synchronization signal sending node by using the time synchronization signal in the first target electrical signal.

In the embodiments, for the process of determining the first optical signal by the first signal processing system according to the initial electrical signal, reference may be made to the foregoing embodiments, and details are not described here. For the process of determining the first target electrical signal by the second signal processing system according to the first optical signal, reference may be made to the foregoing embodiments, and details are not described here again.

In some embodiments, the second signal processing system 62 is configured to determine a second optical signal according to the initial electrical signal, and couple the second optical signal to the optical signal transmission line 63, so that the optical signal transmission line 63 transmits the second optical signal to the first signal processing system 61.

The first signal processing system 61 is configured to obtain the second optical signal from the optical signal transmission line 63, and determine a second target electrical signal according to the second optical signal, so as to synchronize the time of the time synchronization signal sending node and the time of the time synchronization signal receiving node by using the second target electrical signal.

In the embodiments, for the process of determining the second optical signal by the second signal processing system according to the initial electrical signal, reference may be made to the foregoing embodiments, and details are not described herein. For the process of determining the second target electrical signal by the first signal processing system according to the second optical signal, reference may be made to the foregoing embodiments, and details are not described here again.

In some embodiments, the first optical signal and the second optical signal are optical signals with different wavelengths, and a wavelength difference between the first optical signal and the second optical signal is less than or equal to a preset wavelength threshold.

In summary, in the signal transmission subsystem provided according to the embodiments of the present disclosure, at the time synchronization signal sending node, the first signal processing system may directly convert the initial electrical signal including the time synchronization signal into an optical signal for transmission, without extracting the time synchronization signal from the initial electrical signal, thus improving the accuracy of the transmitted time synchronization signal. At the time synchronization signal receiving node, the second signal processing system may directly obtain the optical signal including the time synchronization signal from the optical signal transmission line, and convert the optical signal into the target optical signal, without extracting the time synchronization signal from the optical signal, thus improving the accuracy of the obtained time synchronization signal.

Furthermore, when the time synchronization signal sending node and the time synchronization signal receiving node send the optical signals to the opposite ends respectively, the first optical signal sent by the first signal processing system and the second optical signal sent by the second signal processing system have different wavelengths, which may prevent interference between the optical signals and ensure secure transmission of the optical signals.

Furthermore, the wavelength difference between the first optical signal and the second optical signal is less than or equal to the preset wavelength threshold, which may reduce the delay of the optical signal sent by the time synchronization signal sending node and the optical signal sent by the time synchronization signal receiving node in the optical signal transmission line, thus further improving the accuracy of the time synchronization signals obtained by the corresponding time synchronization signal sending node and the time synchronization signal receiving node in the signal transmission subsystem.

Figure 8:
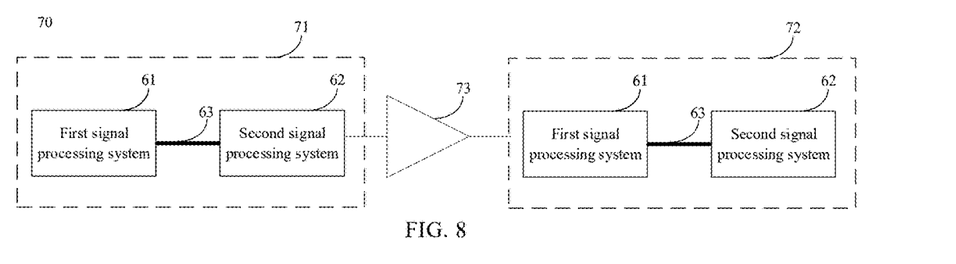
FIG. 8 is a schematic structural diagram of a signal transmission system according to some embodiments of the present disclosure.

According to an embodiment of the present disclosure, there is provided a signal transmission system 70. The signal transmission system may be applied to an optical signal long-distance transmission scenario. As shown in FIG. 8, the signal transmission system 70 includes a first signal transmission subsystem 71, a second signal transmission subsystem 72, and a relay device 73, where the first signal transmission subsystem 71 and the second signal transmission subsystem 72 are signal transmission subsystems in the foregoing embodiments.

In the first signal transmission subsystem 71, the first photoelectric conversion module 101 of the second signal processing system 62 is connected to the first end of the relay device 73; and in the second signal transmission subsystem 72, the first photoelectric conversion module of the first signal processing system 61 is connected to the second end of the relay device 73.

It should be noted that, in the optical signal long-distance transmission scenario, a plurality of signal transmission subsystems may be included, which is not limited in the embodiments of the present disclosure, where two adjacent signal transmission subsystems may be connected by using a relay device to achieve the purpose of long-distance transmission of an optical signal. In the embodiments of the present disclosure, the signal transmission system is described by taking a signal transmission system including a first signal transmission subsystem, a second signal transmission subsystem, and a relay device in the optical signal long-distance transmission scenario as an example.

In some embodiments, in the second signal processing system 62 of the first signal transmission subsystem 71, the first optical path coupling device may obtain the first optical signal sent by the first signal processing system 61 through the optical signal transmission line 63, the first optical signal may be processed into the first electrical signal to be processed by using the second photoelectric conversion module, and then the first electrical signal to be processed may be sent to the first photoelectric conversion module; and after converting the first electrical signal to be processed into the first optical signal to be processed, the first photoelectric conversion module may directly transmit the first optical signal to be processed to the relay device 73.

The relay device 73 may amplify and regenerate the first optical signal to be processed to obtain a regenerated first optical signal to be processed, and send the regenerated first optical signal to be processed to the first photoelectric conversion module in the first signal processing system 61 of the second signal transmission subsystem 72.

In the first signal processing system 61 of the second signal transmission subsystem 72, the first photoelectric conversion module may determine the regenerated first optical signal to be processed as an optical signal to be sent, convert the optical signal to be sent into an electrical signal to be sent, and then send the electrical signal to be sent to the second photoelectric conversion module; and the second photoelectric conversion module converts the electrical signal to be sent into a first optical signal of a preset frequency, and sends the first optical signal to the first optical path coupling device, so that the first optical path coupling device couples the first optical signal to the optical signal transmission line 63, so as to transmit the first optical signal to the second signal processing system 62 of the second signal transmission subsystem 72.

In some embodiments, in the first signal processing system 61 of the second signal transmission subsystem 72, the second optical path coupling device may obtain the second optical signal sent by the second signal processing system 62 through the optical signal transmission line 63, the second optical signal may be processed into the second electrical signal to be processed by using the second photoelectric conversion module, and then the second electrical signal to be processed may be sent to the first photoelectric conversion module; and after converting the second electrical signal to be processed into the second optical signal to be processed, the first photoelectric conversion module 101 may directly transmit the second optical signal to be processed to the relay device 73.

The relay device 73 may amplify and regenerate the second optical signal to be processed to obtain a regenerated second optical signal to be processed, and send the regenerated second optical signal to be processed to the first photoelectric conversion module in the second signal processing system 62 of the first signal transmission subsystem 71.

In the second signal processing system 62 of the second signal transmission subsystem 71, the first photoelectric conversion module may determine the regenerated second optical signal to be processed as an optical signal to be sent, convert the optical signal to be sent into an electrical signal to be sent, then send the electrical signal to be sent to the second photoelectric conversion module: and the second photoelectric conversion module converts the electrical signal to be sent into a second optical signal of a preset frequency, and sends the second optical signal to the second optical path coupling device, so that the second optical path coupling device couples the second optical signal to the optical signal transmission line 63, so as to transmit the second optical signal to the first signal processing system 61 of the first signal transmission subsystem 71.

In summary, in the signal transmission system provided according to the embodiments of the present disclosure, in a long-distance signal transmission scenario, the second signal processing system in the first signal transmission subsystem may directly obtain the optical signal including the time synchronization signal from the optical signal transmission line, convert the optical signal into the optical signal to be processed, without extracting the time synchronization signal from the optical signal, which may prevent interference caused by the process such as time synchronization signal extraction and processing on the accuracy of the time synchronization signal, and may improve the accuracy of the transmitted time synchronization signal.

Furthermore, the optical signal to be processed is regenerated by the relay device to obtain the regenerated optical signal to be processed, and the regenerated optical signal to be processed is directly sent to the first photoelectric conversion module in the first signal processing system of the second signal transmission subsystem, so that the first photoelectric conversion module determines the regenerated optical signal to be processed as the optical signal to be sent for transmission, where the optical signal does not need to be processed by the time synchronization device, which may further improve the accuracy of the transmitted time synchronization signal.

Figure 9:
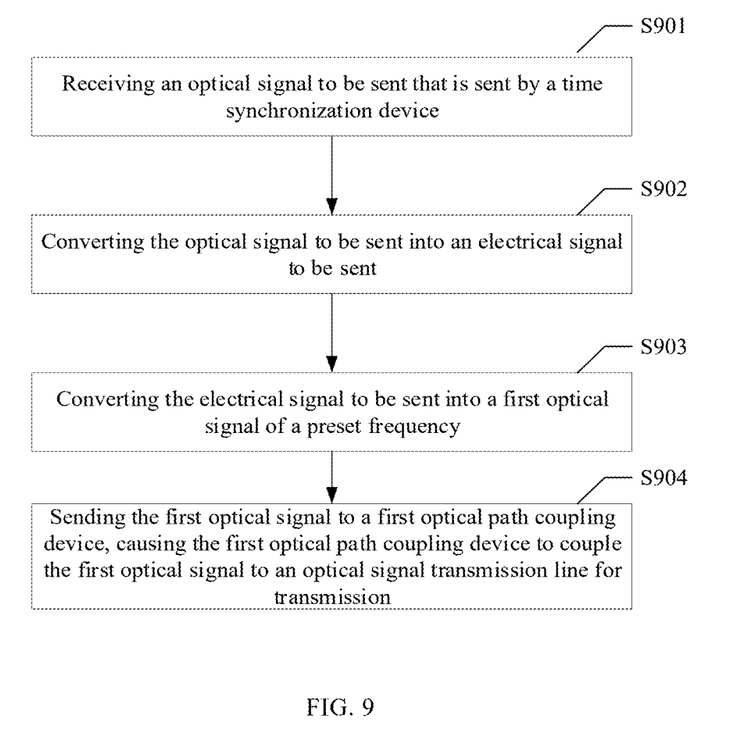
FIG. 9 is a schematic flowchart of a signal processing method according to some embodiments of the present disclosure.

According to an embodiment of the present disclosure, there is provided a signal processing method. The signal processing method may be applied to the above signal processing device, and the signal processing device may be a signal processing device of a time synchronization signal sending node. As shown in FIG. 9, the method includes steps S901 to S904.

In step S901, an optical signal to be sent that is sent by a time synchronization device is received. In some embodiments, the optical signal to be sent is generated by the time synchronization device based on an initial electrical signal, and the initial electrical signal includes a service signal and a time synchronization signal.

In step S902, the optical signal to be sent is converted into an electrical signal to be sent. In the step S902, the first photoelectric conversion module of the signal processing device may convert the optical signal to be sent into an electrical signal to be sent, and transmit the electrical signal to be sent to the second photoelectric conversion module.

In step S903, the electrical signal to be sent is converted into a first optical signal of a preset frequency.

In the step S903, the second photoelectric conversion module of the signal processing device may convert the electrical signal to be sent into a first optical signal of a preset frequency.

In step S904, the first optical signal is sent to the first optical path coupling device, so that the first optical path coupling device couples the first optical signal to the optical signal transmission line for transmission.

In summary, according to the signal processing method provided in the embodiments of the present disclosure, the optical signal to be sent that is sent by the time synchronization device may be received, the optical signal to be sent may be converted into the electrical signal to be sent, and then, the electrical signal to be sent may be converted into the first optical signal of the preset frequency for transmission, without extracting the time synchronization signal from the optical signal to be sent, which may prevent the interference caused by the process such as the time synchronization signal extraction and processing on the accuracy of the time synchronization signal, and improve the accuracy of the transmitted time synchronization signal.

In some embodiments, the signal processing method further includes: receiving a second optical signal of a preset frequency sent by a second optical path coupling device, where the second optical signal is obtained by the second optical path coupling device from the optical signal transmission line; converting the second optical signal into a second electrical signal to be processed; converting the second electrical signal to be processed into a second optical signal to be processed; and sending the second optical signal to be processed to the time synchronization device.

In some embodiments, the first optical signal and the second optical signal are optical signals with different wavelengths.

In some embodiments, a wavelength difference between the first optical signal and the second optical signal is less than or equal to a preset wavelength threshold.

In some embodiments, the signal processing device may be a signal processing device of the time synchronization signal receiving node, and the signal processing method includes: receiving a first optical signal sent by the first optical path coupling device, and sending the first optical signal to the second photoelectric conversion module; converting, by the second photoelectric conversion module, the first optical signal into a first electrical signal to be processed, and sending the first electrical signal to be processed to the first photoelectric conversion module; and, converting, by the first photoelectric conversion module, the first electrical signal to be processed into a first optical signal to be processed, and sending the first optical signal to be processed to the time synchronization device; where the first optical signal is obtained by the first optical path coupling device from the optical signal transmission line. According to some other embodiments of the present disclosure, there is provided a signal processing method. The signal processing method includes: receiving a first optical signal of a preset frequency sent by a first optical path coupling device, where the first optical signal is obtained by the first optical path coupling device from an optical signal transmission line; converting the first optical signal into a first electrical signal to be processed; converting the first electrical signal to be processed into a first optical signal to be processed; and sending the first optical signal to be processed to a time synchronization device.

In some embodiments, the signal processing method further includes: receiving an optical signal to be sent that is sent by the time synchronization device; converting the optical signal to be sent into an electrical signal to be sent; converting the electrical signal to be sent into a second optical signal of a preset frequency; and sending the second optical signal to a second optical path coupling device, so that the second optical path coupling device couples the second optical signal to the optical signal transmission line for transmission.

In some embodiments, the first optical signal and the second optical signal are optical signals with different wavelengths.

In some embodiments, a wavelength difference between the first optical signal and the second optical signal is less than or equal to a preset wavelength threshold.

It should be understood that the present disclosure is not limited to the precise structures that have been described above and shown in the accompanying drawings, and various modifications and changes may be made without departing from the scope of the present disclosure. The scope of the present disclosure is defined only by the appended claims.

What is claimed is:

1. A signal processing device, comprising:
a first photoelectric conversion module, configured to receive an optical signal to be sent that is sent by a time synchronization device, convert the optical signal to be sent into an electric signal to be sent, and transmit the electric signal to be sent to a second photoelectric conversion module, wherein the optical signal to be sent is generated by the time synchronization device according to an initial electrical signal, and the initial electrical signal comprises a service signal and a time synchronization signal, causing that in a process of transmitting the time synchronization signal, the signal processing device does not need to extract the time synchronization signal from the service signal; and the second photoelectric conversion module, configured to convert the electrical signal to be sent into a first optical signal of a preset frequency, and send the first optical signal to a first optical path coupling device, causing the first optical path coupling device to couple the first optical signal to an optical signal transmission line for transmission.

2. The signal processing device according to claim 1, wherein, the second photoelectric conversion module is further configured to receive a second optical signal of a preset frequency sent by a second optical path coupling device, convert the second optical signal into a second electrical signal to be processed, and send the second electrical signal to be processed to the first photoelectric conversion module, wherein the second optical signal is obtained by the second optical path coupling device from the optical signal transmission line; and the first photoelectric conversion module is further configured to convert the second electric signal to be processed into a second optical signal to be processed, and send the second optical signal to be processed to the time synchronization device.

3. The signal processing device according to claim 2, wherein a wavelength difference between the first optical signal and the second optical signal is less than or equal to a preset wavelength threshold.

4. A signal processing system, comprising a time synchronization device, the signal processing device according to claim 1, and a first optical path coupling device;

wherein the time synchronization device is configured to generate the optical signal to be sent according to an initial electrical signal, and send the optical signal to be sent to the signal processing device, and the initial electrical signal comprises a service signal and a time synchronization signal;

the signal processing device is configured to convert the optical signal to be sent into the first optical signal of the preset frequency, and send the first optical signal to the first optical path coupling device; and the first optical path coupling device is configured to couple the first optical signal to the optical signal transmission line for transmission.

5. A signal transmission subsystem, comprising a first signal processing system, a second signal processing system, and an optical signal transmission line, wherein the first signal processing system is the signal processing system according to claim 4; and the first signal processing system and the second signal processing system are connected through the optical signal transmission line.

6. A signal transmission system, comprising a first signal transmission subsystem, a second signal transmission subsystem, and a relay device, wherein the first signal transmission subsystem and the second signal transmission subsystem are the signal transmission subsystems according to claim 5; and in the first signal transmission subsystem, the first photoelectric conversion module of the second signal processing system is connected to a first end of the relay device; and in the second signal transmission subsystem, the first photoelectric conversion module of the first signal processing system is connected to a second end of the relay device.

7. A signal processing device, comprising:

a second photoelectric conversion module, configured to receive a first optical signal of a preset frequency sent by a first optical path coupling device, convert the first optical signal into a first electrical signal to be processed, and send the first electrical signal to be processed to a first photoelectric conversion module, wherein the first optical signal is obtained by the first optical path coupling device from an optical signal transmission line; and the first photoelectric conversion module, configured to convert the first electric signal to be processed into a first optical signal to be processed, and send the first optical signal to be processed to a time synchronization device;

wherein the first photoelectric conversion module is further configured to receive an optical signal to be sent that is sent by the time synchronization device, convert the optical signal to be sent into an electric signal to be sent, and transmit the electrical signal to be sent to the second photoelectric conversion module, wherein the optical signal to be sent is generated by the time synchronization device according to an initial electrical signal, and the initial electrical signal comprises a service signal and a time synchronization signal, causing that in a process of transmitting the time synchronization signal, the signal processing device does not need to extract the time synchronization signal from the service signal;

the second photoelectric conversion module is further configured to convert the electrical signal to be sent into a second optical signal of a preset frequency, and send the second optical signal to a second optical path coupling device, causing the second optical path coupling device to couple the second optical signal to the optical signal transmission line for transmission; and a wavelength difference between the first optical signal and the second optical signal is less than or equal to a preset wavelength threshold.

8. A signal processing system, comprising a time synchronization device, the signal processing device according to claim 7, and a first optical path coupling device;

wherein the first optical path coupling device is configured to obtain the first optical signal from the optical signal transmission line, and send the first optical signal to the signal processing device;

the signal processing device is configured to convert the first optical signal into the first optical signal to be processed, and send the first optical signal to be processed to the time synchronization device; and the time synchronization device is configured to convert the first optical signal to be processed into a first target electrical signal.

9. A signal transmission subsystem, comprising a first signal processing system, a second signal processing system, and an optical signal transmission line, wherein the first signal processing system is the signal processing system according to claim 8; and the first signal processing system and the second signal processing system are connected through the optical signal transmission line.

10. A signal processing method, comprising:

receiving an optical signal to be sent that is sent by a time synchronization device, wherein the optical signal to be sent is generated by the time synchronization device according to an initial electrical signal, and the initial electrical signal comprises a service signal and a time synchronization signal, and in a process of transmitting the time synchronization signal, the time synchronization signal does not need to be extracted from the service signal;

converting the optical signal to be sent into an electrical signal to be sent;

converting the electrical signal to be sent into a first optical signal of a preset frequency; and sending the first optical signal to a first optical path coupling device, causing the first optical path coupling device to couple the first optical signal to an optical signal transmission line for transmission.

* * * * *